(12) United States Patent
Gupta

(10) Patent No.: US 10,095,935 B2
(45) Date of Patent: Oct. 9, 2018

(54) VEHICLE VISION SYSTEM WITH ENHANCED PEDESTRIAN DETECTION

(71) Applicant: MAGNA ELECTRONICS INC., Auburn Hills, MI (US)

(72) Inventor: Nikhil Gupta, Brampton (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 297 days.

(21) Appl. No.: 14/573,306

(22) Filed: Dec. 17, 2014

(65) Prior Publication Data
US 2015/0178576 A1 Jun. 25, 2015

Related U.S. Application Data

(60) Provisional application No. 61/919,130, filed on Dec. 20, 2013.

(51) Int. Cl.
| | | |
|---|---|---|
| H04N 7/18 | (2006.01) | |
| H04N 7/00 | (2011.01) | |
| G06F 7/00 | (2006.01) | |
| G06K 9/00 | (2006.01) | |
| H04N 5/232 | (2006.01) | |

(52) U.S. Cl.
CPC ..... *G06K 9/00805* (2013.01); *G06K 9/00369* (2013.01); *H04N 5/23238* (2013.01); *G06K 2209/21* (2013.01)

(58) Field of Classification Search
CPC .. H04N 7/18; H04N 2300/105; H04N 5/2128; H04N 5/23238; H04N 7/181; G06T 2207/10016; B60K 31/0008; B60R 21/01538

USPC .............. 348/148, 36; 382/103, 104; 701/96
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,532,109 B2 | 5/2009 | Takahama et al. |
| 7,720,580 B2 | 5/2010 | Higgins-Luthman |
| 7,855,755 B2 | 12/2010 | Weller et al. |
| 8,027,029 B2 | 9/2011 | Lu et al. |
| 9,205,776 B2 | 12/2015 | Turk |
| 9,319,637 B2 | 4/2016 | Lu et al. |
| 2006/0015242 A1* | 1/2006 | Yoshida ................. G08G 1/161 701/96 |

(Continued)

*Primary Examiner* — Thai Tran
*Assistant Examiner* — Syed Hasan
(74) *Attorney, Agent, or Firm* — Honigman Miller Schwartz and Cohn, LLP

(57) ABSTRACT

A vision system of a vehicle includes a camera disposed at a vehicle and having a field of view that encompasses first and second regions exterior of the vehicle. The camera captures image data that includes a first set of image data representative of the first region of the field of view and a second set of image data representative of the second region of the field of view. An image processor processes the first set of image data to detect a pedestrian present in the first region based on a first predetermined orientation of a pedestrian. The image processor processes the second set of image data to detect a pedestrian present in the second region based on a second predetermined orientation of a pedestrian.

17 Claims, 5 Drawing Sheets

(56) References Cited

U.S. PATENT DOCUMENTS

| | | | |
|---|---|---|---|
| 2008/0239076 A1* | 10/2008 | Luo | G06K 9/00798 |
| | | | 348/148 |
| 2008/0246843 A1* | 10/2008 | Nagata | B60R 1/00 |
| | | | 348/148 |
| 2010/0208032 A1* | 8/2010 | Kweon | G03B 37/00 |
| | | | 348/36 |
| 2013/0107048 A1* | 5/2013 | Rottner | H04N 5/23238 |
| | | | 348/148 |
| 2013/0194381 A1* | 8/2013 | McMahon | H04N 7/181 |
| | | | 348/36 |
| 2013/0250114 A1 | 9/2013 | Lu | |
| 2014/0043473 A1 | 2/2014 | Gupta et al. | |
| 2014/0169627 A1 | 6/2014 | Gupta | |
| 2015/0049193 A1 | 2/2015 | Gupta | |
| 2015/0086077 A1* | 3/2015 | Du | G06K 9/00369 |
| | | | 382/104 |
| 2015/0175072 A1 | 6/2015 | Sabeti | |
| 2015/0179074 A1 | 6/2015 | Gupta | |
| 2015/0302258 A1* | 10/2015 | Umezaki | G08G 1/166 |
| | | | 382/103 |
| 2016/0075332 A1 | 3/2016 | Edo-Ros | |

* cited by examiner

US 10,095,935 B2

VEHICLE VISION SYSTEM WITH ENHANCED PEDESTRIAN DETECTION

CROSS REFERENCE TO RELATED APPLICATION

The present application is related to U.S. provisional application Ser. No. 61/919,130, filed Dec. 20, 2013, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle.

The present invention provides for enhanced pedestrian detection by applying different processing and/or learning algorithms to different regions or sub-regions of captured images, in order to adapt the image processing for the particular sub-regions of the captured images. The present invention thus may process image data of one sub-region in a first manner to provide enhanced detection of pedestrians based on the typical orientation and/or size of pedestrians when located or found in that area relative to the vehicle camera, and may process image data of another sub-region in a second or different manner to provide enhanced detection of pedestrians based on the typical orientation and/or size of pedestrians when located or found in that other area relative to the vehicle camera.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
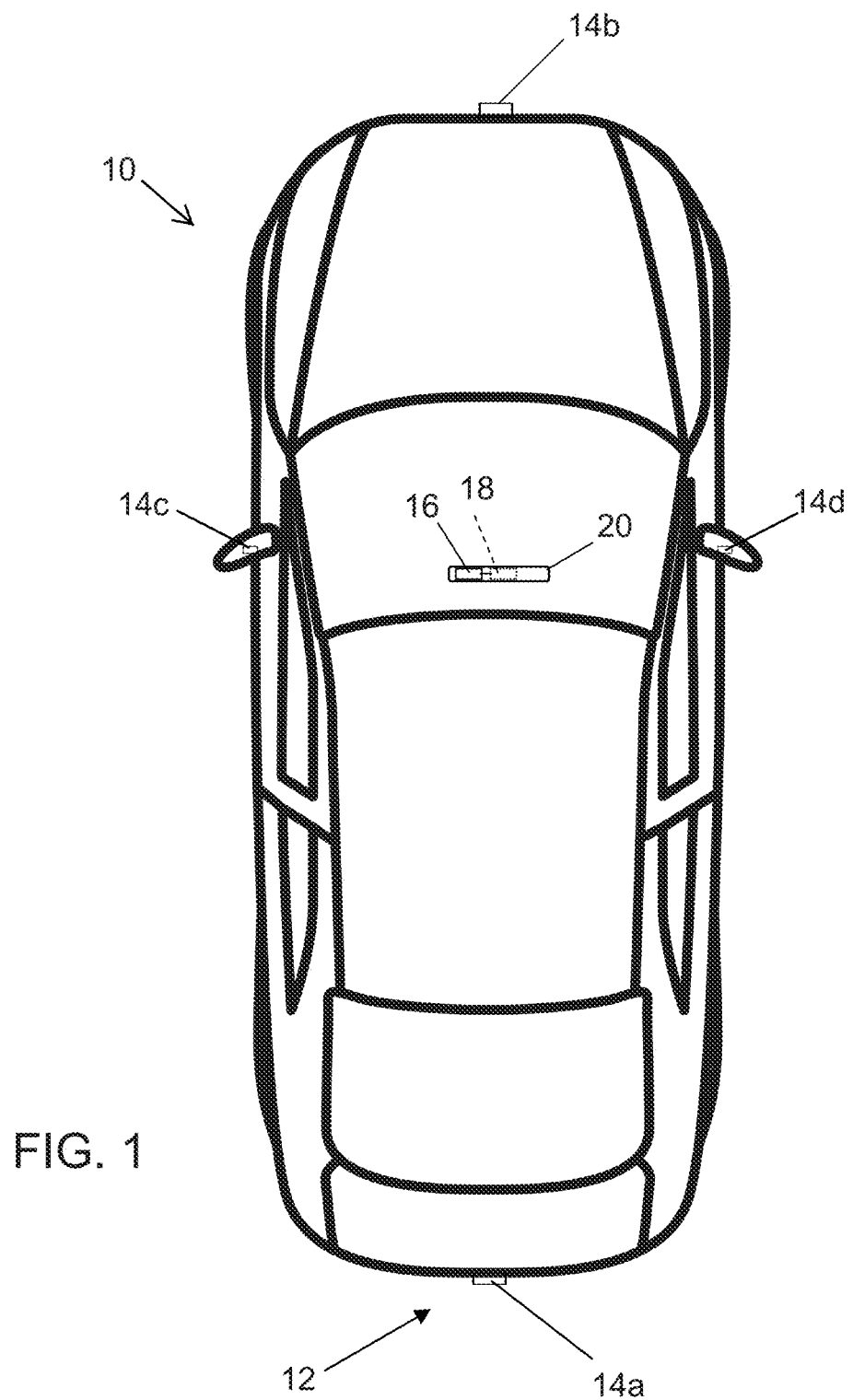
FIG. 1 is a plan view of a vehicle with a vision system that incorporates cameras in accordance with the present invention.
Figure 2:
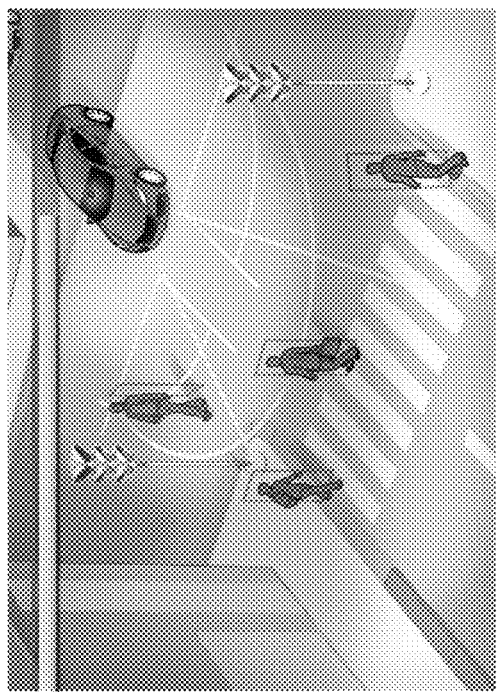
FIG. 2 is a perspective view of a vehicle and pedestrians forward of the vehicle and in the field of view of the forward facing camera or cameras of the vehicle.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The vision system of the present invention is operable to process captured image data to detect objects, such as pedestrians or the like, in the field of view of the camera or cameras. The vision system of the present invention significantly improves the accuracy of pedestrian detection using fish eye images. The pedestrian detection feature of the present invention is suitable for use in a smart rear camera and/or a surround view system of a vehicle.

When applied to fish-eye cameras, pedestrian detection (PD) learning methods, which are simply extended from PD works on narrow angle field of view (FOV), suffer significantly. This is because of the dramatic difference in the sizes and orientations of the pedestrians across a fish-eye image, which if left unaccounted for, will lead to a loss in performance of the detection system. The system of the present invention reduces or mitigates this effect by providing an explicit strategy for countering this variation in pedestrian size and orientation.

Because the present invention explicitly accounts for the variations in the sizes/orientations of the pedestrians for learning, the output classification is more robust and consistent. To achieve this, the system of the present invention sub-divides the fish-eye image into regions based on knowledge of the camera optics and the orientation of the camera, and a different cascaded learning or processing is applied to each divided sub-region of the captured image. This allows dedicated non-overlapping classifiers to be used over a single fish-eye image which are specifically designed for localizing the differently shaped pedestrians.

Without this development it may be difficult to achieve the required performance accuracy required without a significant expense (both time and money). The present invention allows the vision system to achieve the same performance with less training data and reduced cost.

Surround awareness and driver assistance is a marketable feature for vehicles, and such systems may provide generic object detection using the likes of a wide angle or fish eye camera. Classification and detection of pedestrians in the scene is desired to add value to existing detection based algorithms and to act as a standalone pedestrian detection feature.

Figure 3:
FIG. 3 is an image of a pedestrian in front of a vehicle.

Classification of pedestrians is a learning based problem and there are various possibilities for classifier design, such as, for example, HOG+SVM, Channel Filters+AdaBoost and/or the like. Most past developments centered around classification using the data from a narrow-angle field of view of a camera, with reasonably large pedestrians in the image that are usually vertically oriented (such as shown in FIG. 3).

There is an increase in the use of fish-eye optics with the developing market interest in smart rear view cameras and surround view systems. Typical pedestrian development with this wide-angle optics extends the narrow-angle field of view (FOV) paradigm to the fish-eye images. Typically, a single classifier model with scaling is employed across the entire image. Such a model may not be sufficient to provide adequate detection and identification of pedestrians present in the field of view of the camera.

Figure 4A:
FIGS. 4A-F are captured images showing different positions and sizes and orientations of pedestrians in the fields of view of the respective vehicle cameras.
Figure 4B:
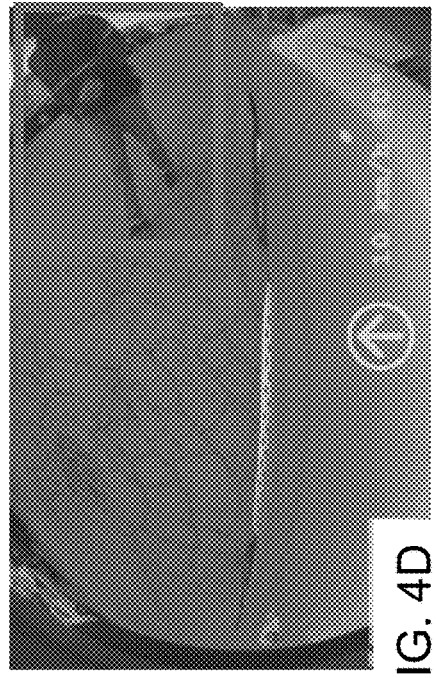
Figure 4C:
Figure 4D:
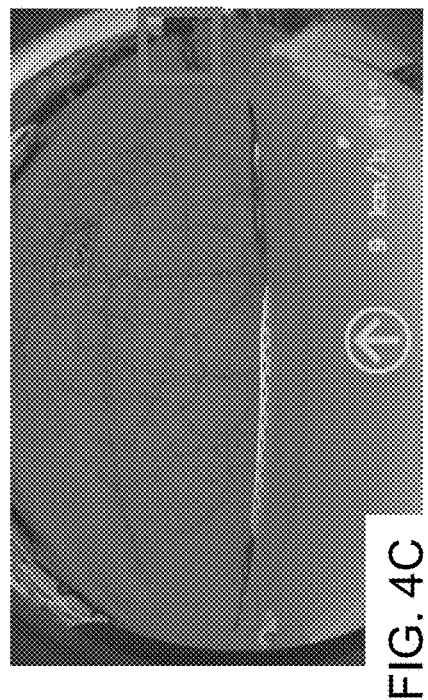
Figure 4E:
Figure 4F:
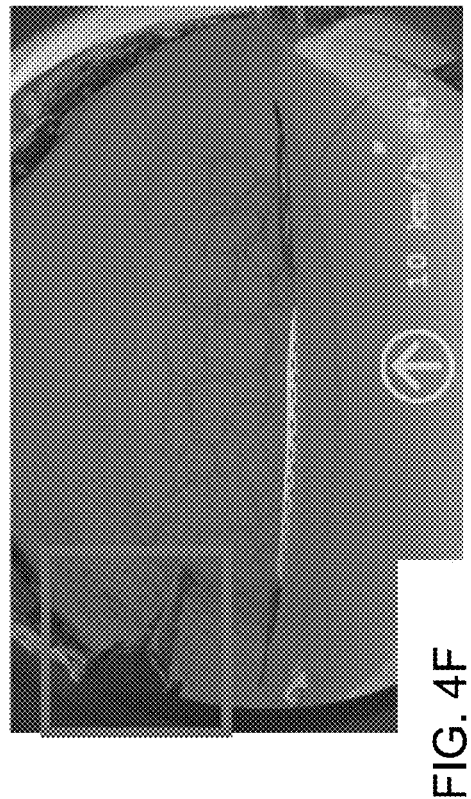

This creates performance/robustness issues since the variations possible in the presentation of pedestrians in these images is substantial, and the pedestrians not only vary in size, but also in orientation. As shown in FIGS. 4A-F, the system must cover ranges from very small pedestrians far away to very large pedestrians close up, and this includes pedestrian orientations in the image from 0 degrees (vertical) to nearly 90 degrees (horizontal). For example, and as shown in FIGS. 4A, 4B and 4E, an image of a pedestrian captured by a forward or rearward viewing camera (disposed at the front or rear of the vehicle), is generally vertically oriented, with the size varying depending on proximity to the camera and vehicle, while, and as shown in FIGS. 4C, 4D and 4F, an image of a pedestrian captured by a sideward and downward viewing camera (disposed at the side of the vehicle, such as for a surround vision system), may be angled or non-vertically oriented at varying degrees depending on how far to the side (forward or rearward of the vehicle) of the captured image the pedestrian is located, and may be generally vertically oriented at the center of the captured image.

Figure 5:
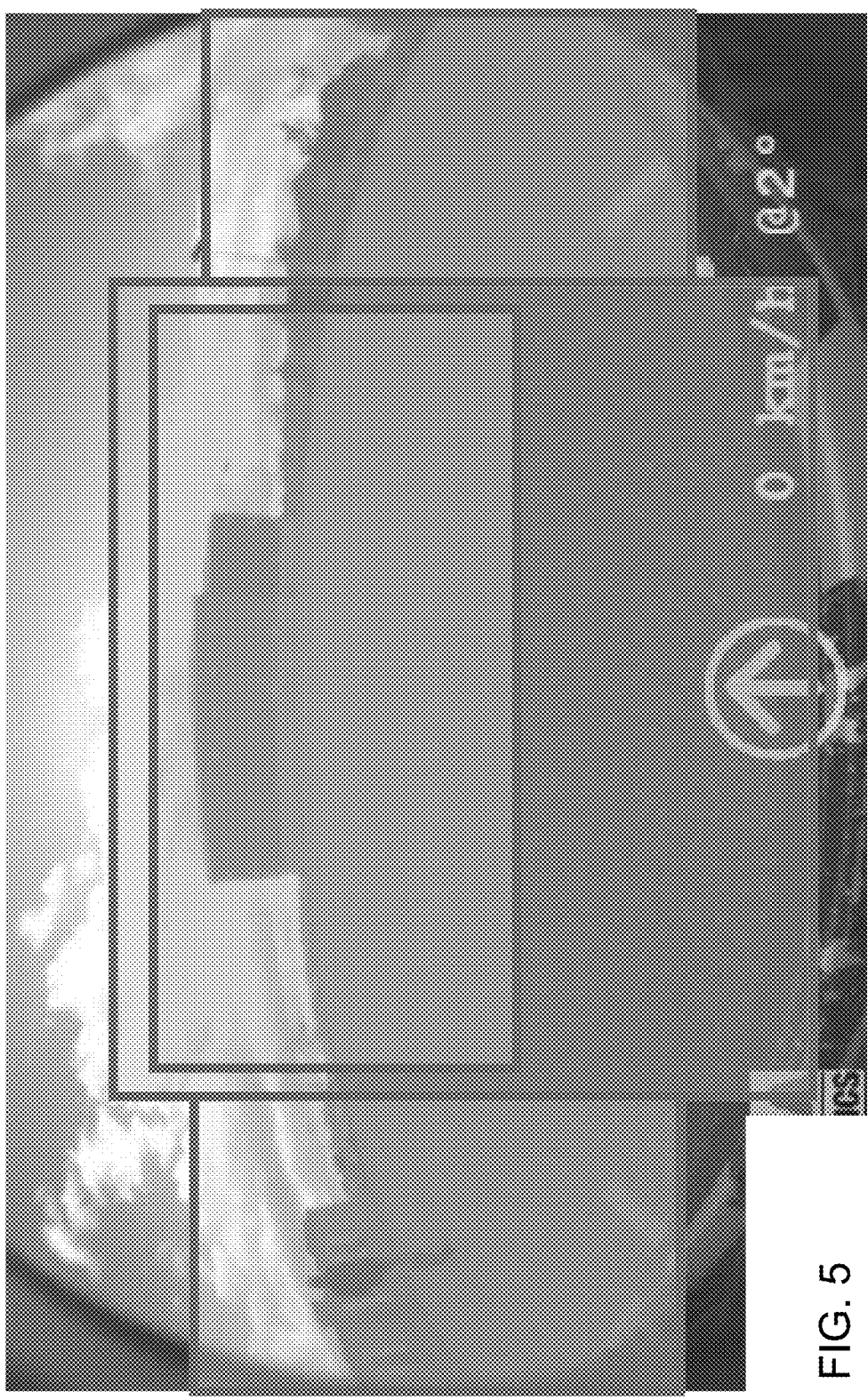
FIG. 5 is an image showing the different regions of the divided image that can be trained independently in accordance with the present invention.

To mitigate the effect of the variable orientation, geometry and size of the captured images of pedestrians, the present invention provides an adaptive classifier training strategy. The system of the present invention utilizes knowledge or characteristics or properties of the optics and the extrinsic orientation of the camera at the vehicle to train multiple classifiers. As shown in FIG. 5, the system divides the image into several areas which can be processed and trained independently using any given learning method (SVM, Adaboost, and/or the like). These areas are based on the different distortions and pedestrian orientations and facilitate the classification process. The eventual classification output is the union of all the classification outputs in the various regions.

For example, and with reference to FIG. 5 (which shows an exemplary captured image as captured by a forward or rearward viewing camera of a vehicle), the system may divide the captured image into four sub-regions (or more or less depending on the particular application), with the side sub-regions processed and adapted in a particular manner, and with the lower center sub-region processed and adapted in a second or different manner, and with the center or upper center sub-region processed and adapted in a third or different manner. Optionally, for a sideward or downward viewing vehicle camera, there may be more sub-regions or divisions to account for the greater change in orientation of a pedestrian as the pedestrian moves from forward or rearward of the vehicle (at the outer side bounds of the captured image where the pedestrian image may be angled or skewed or substantially non-vertically oriented) towards the side of the vehicle (and towards the center of the captured image where the pedestrian image may be generally vertically oriented).

Captured image data of each sub-region is thus processed differently and in accordance with selected parameters unique or applicable to that particular sub-region. Thus, the present invention provides enhanced processing of captured image data to detect pedestrians that may be present in the field of view of the camera. Although shown and described as being able to detect pedestrians, aspects of the present invention may be suitable for detection of various objects or vehicles or the like that may be present in the field of view of the camera of the vehicle vision system.

Thus, the vision system of the present invention includes at least one camera disposed at a vehicle and having a field of view exterior of the vehicle, with the field of view encompassing at least a first region exterior of the vehicle and a second region exterior of the vehicle. The camera captures image data that includes a first set of image data representative of the first region of the field of view and a second set of image data representative of the second region of the field of view. An image processor is operable to process image data captured by the camera. The image processor processes the first set of image data to detect a pedestrian present in the first region of the field of view, and the processing of the first set may be done in a first manner, such as based on a first predetermined orientation of a pedestrian, whereby a pedestrian is determined to be present in the first region responsive to a detected object having an orientation and/or size that generally corresponds to or matches the first predetermined orientation (and/or size) of a pedestrian (with the first predetermined orientation optionally being derived via image processing or based on a typical pedestrian orientation for a pedestrian in the first region as captured by the camera in images or image data). The image processor processes the second set of image data to detect a pedestrian present in the second region of the field of view, and the processing of the second set may be done in a second manner, such as based on a second predetermined orientation of a pedestrian, whereby a pedestrian is determined to be present in the second region responsive to a detected object having an orientation and/or size that generally corresponds to or matches the second predetermined orientation (and/or size) of a pedestrian (with the second predetermined orientation optionally being derived via image processing or based on a typical pedestrian orientation for a pedestrian in the second region as captured by the camera in images or image data).

For example, the first region may be at a side region of the field of view of the camera and the second region may be at a center region of the field of view of the camera. Then, the second predetermined orientation of a pedestrian (at the second region or center region) may be generally vertical, and the first predetermined orientation of a pedestrian (at the first region or side region) is tilted relative to the second predetermined orientation of a pedestrian (due to the optical distortion of the wide angle lens of the camera at the side or outer regions of its field of view).

Optionally, responsive to processing of captured image data over multiple frames of captured image data, the image processor may adjust the first predetermined orientation of a pedestrian and may adjust the second predetermined orientation of a pedestrian, such as to accommodate a shift or change in the camera. For example, if the image processor determines that the detected objects in the second region are tilted or non-vertical (or determines that the detected objects in the first region are more or less tilted as compared to an initial predetermined orientation), then the system may determine that a shift or change has occurred and may adjust the first and second orientations to accommodate the shift or change.

The vision system may comprise a surround-view vision system having a plurality of cameras disposed at a vehicle with respective fields of view exterior of the vehicle. The plurality of cameras includes at least (i) a rear camera disposed at a rearward portion of the vehicle and having a generally rearward field of view, (ii) a first side camera disposed at a first side of the vehicle and having a generally sideward field of view at the first side of the vehicle, and (iii) a second side camera disposed at a second side of the vehicle and having a generally sideward field of view at the second side of the vehicle. The system may process image data captured by each camera in the manner described above to provide enhanced pedestrian detection at the regions within the fields of view of the respective cameras.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or PCT Application No. PCT/US2014/042229, filed Jun. 13, 2014, and/or U.S. patent application Ser. No. 14/535,739, filed Nov. 7, 2014; Ser. No. 14/524,203, filed Oct. 27, 2014; Ser. No. 14/519,469, filed Oct. 21, 2014; Ser. No. 14/391,841, filed Oct. 10, 2014; Ser. No. 14/489,659, filed Sep. 18, 2014; Ser. No. 14/446,099, filed Aug. 22, 2014; Ser. No. 14/377,940, filed Aug. 11, 2014; Ser. No. 14/377,939, filed Aug. 11, 2014; Ser. No. 14/456,164, filed Aug. 11, 2014; Ser. No. 14/456,163, filed Aug. 11, 2014; Ser. No. 14/456,162, filed Aug. 11, 2014; Ser. No. 14/373,501, filed Jul. 21, 2014; Ser. No. 14/372,524, filed Jul. 16, 2014; Ser. No. 14/324,696, filed Jul. 7, 2014; Ser. No. 14/369,229, filed Jun. 27, 2014;

Ser. No. 14/316,940, filed Jun. 27, 2014; Ser. No. 14/316,939, filed Jun. 27, 2014; Ser. No. 14/303,696, filed Jun. 13, 2014; Ser. No. 14/303,695, filed Jun. 13, 2014; Ser. No. 14/303,694, filed Jun. 13, 2014; Ser. No. 14/303,693, filed Jun. 13, 2014; Ser. No. 14/297,663, filed Jun. 6, 2014; Ser. No. 14/362,636, filed Jun. 4, 2014; Ser. No. 14/290,028, filed May 29, 2014; Ser. No. 14/290,026, filed May 29, 2014; Ser. No. 14/359,341, filed May 20, 2014; Ser. No. 14/359,340, filed May 20, 2014; Ser. No. 14/282,029, filed May 20, 02014; Ser. No. 14/282,028, filed May 20, 2014; Ser. No. 14/358,232, filed May 15, 2014; Ser. No. 14/272,834, filed May 8, 2014; Ser. No. 14/356,330, filed May 5, 2014; Ser. No. 14/269,788, filed May 5, 2014; Ser. No. 14/268,169, filed May 2, 2014; Ser. No. 14/264,443, filed Apr. 29, 2014; Ser. No. 14/354,675, filed Apr. 28, 2014; Ser. No. 14/248,602, filed Apr. 9, 2014; Ser. No. 14/242,038, filed Apr. 1, 2014; Ser. No. 14/229,061, filed Mar. 28, 2014; Ser. No. 14/343,937, Mar. 10, 2014; Ser. No. 14/343,936, Mar. 10, 2014; Ser. No. 14/195,135, filed Mar. 3, 2014; Ser. No. 14/195,136, Mar. 3, 2014; Ser. No. 14/191,512, Feb. 27, 2014; Ser. No. 14/183,613, Feb. 19, 2014; Ser. No. 14/169,329, Jan. 31, 2014; Ser. No. 14/169,328, Jan. 31, 2014; Ser. No. 14/163,325, Jan. 24, 2014; Ser. No. 14/159,772, Jan. 21, 2014; Ser. No. 14/107,624, filed Dec. 16, 2013; Ser. No. 14/102,981, Dec. 11, 2013; Ser. No. 14/102,980, Dec. 11, 2013; Ser. No. 14/098,817, Dec. 6, 2013; Ser. No. 14/097,581, Dec. 5, 2013; Ser. No. 14/093,981, Dec. 2, 2013; Ser. No. 14/093,980, filed Dec. 2, 2013; Ser. No. 14/082,573, Nov. 18, 2013; Ser. No. 14/082,574, Nov. 18, 2013; Ser. No. 14/082,575, Nov. 18, 2013; Ser. No. 14/082,577, Nov. 18, 2013; Ser. No. 14/071,086, Nov. 4, 2013; Ser. No. 14/076,524, Nov. 11, 2013; Ser. No. 14/052,945, filed Oct. 14, 2013; Ser. No. 14/046,174, Oct. 4, 2013; Ser. No. 14/016,790, Oct. 3, 2013; Ser. No. 14/036,723, Sep. 25, 2013; Ser. No. 14/016,790, Sep. 3, 2013; Ser. No. 14/001,272, Aug. 23, 2013; Ser. No. 13/970,868, Aug. 20, 2013; Ser. No. 13/964,134, Aug. 12, 2013; Ser. No. 13/942,758, filed Jul. 16, 2013; Ser. No. 13/942,753, Jul. 16, 2013; Ser. No. 13/927,680, Jun. 26, 2013; Ser. No. 13/916,051, Jun. 12, 2013; Ser. No. 13/894,870, May 15, 2013; Ser. No. 13/887,724, May 6, 2013; Ser. No. 13/852,190, Mar. 28, 2013; Ser. No. 13/851,378, filed Mar. 27, 2013; Ser. No. 13/848,796, Mar. 22, 2012; Ser. No. 13/847,815, Mar. 20, 2013; Ser. No. 13/800,697, Mar. 13, 2013; Ser. No. 13/785,099, Mar. 5, 2013; Ser. No. 13/779,881, Feb. 28, 2013; Ser. No. 13/774,317, Feb. 22, 2013; Ser. No. 13/774,315, Feb. 22, 2013; Ser. No. 13/681,963, filed Nov. 20, 2012; Ser. No. 13/660,306, Oct. 25, 2012; Ser. No. 13/653,577, Oct. 17, 2012; and/or Ser. No. 13/534,657, Jun. 27, 2012, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686; and/or WO 2013/016409, and/or U.S. Pat. Publication No. US 2010-0020170, and/or U.S. patent application Ser. No. 13/534,657, Jun. 27, 2012, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication No. US-2006-0061008 and/or U.S.

patent application Ser. No. 12/578,732, Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:

at least one camera disposed at a vehicle and having a field of view exterior of the vehicle, wherein the field of view encompasses a first region exterior of the vehicle and a second region exterior of the vehicle;

wherein the first region is at a side region of the field of view of said camera and the second region is at a center region of the field of view of said camera;

wherein said camera captures image data and wherein captured image data includes a first set of image data representative of the first region of the field of view and a second set of image data representative of the second region of the field of view;

wherein said camera comprises a wide angle lens and wherein distortion in captured image data is greater in the first set of image data representative of the first region of the field of view of said camera than in the second set of image data representative of the second region of the field of view of said camera;

an image processor operable to process image data captured by said camera;

wherein said image processor processes image data captured by said at least one camera to detect objects present in the field of view of said at least one camera;

wherein said image processor, responsive to processing of image data captured by said at least one camera, determines that a detected object is a pedestrian at least in part responsive to an orientation of the detected object;

wherein said image processor processes the first set of image data and determines a pedestrian present in the first region of the field of view based at least in part on determination that the orientation of an object detected present in the first region of the field of view of said at least one camera corresponds with a first predetermined orientation of a pedestrian;

wherein said image processor processes the second set of image data and determines a pedestrian present in the second region of the field of view based at least in part on determination that the orientation of an object detected present in the second region of the field of view of said at least one camera corresponds with a second predetermined orientation of a pedestrian;

wherein said second predetermined orientation of a pedestrian is different than said first predetermined orientation of a pedestrian; and wherein the second predetermined orientation of a pedestrian is vertical, and wherein the first predetermined orientation of a pedestrian is tilted relative to the second predetermined orientation of a pedestrian.

2. The vision system of claim 1, wherein said camera comprises a camera of a surround vision system of the vehicle.

3. The vision system of claim 1, wherein said camera includes a wide angle lens and a two-dimensional array of photosensing elements.

4. The vision system of claim 1, wherein said image processor processes the first set of image data to determine a pedestrian present in the first region based on a first predetermined size of a pedestrian, and wherein said image processor processes the second set of image data to determine a pedestrian present in the second region based on a second predetermined size of a pedestrian.

5. The vision system of claim 1, wherein, responsive to processing of captured image data over multiple frames of captured image data, said image processor adjusts the first predetermined orientation of a pedestrian and adjusts the second predetermined orientation of a pedestrian.

6. The vision system of claim 5, wherein said image processor adjusts processing of the first set of image data based on the adjusted first predetermined orientation of a pedestrian, and wherein said image processor adjusts processing of the second set of image data based on the adjusted second predetermined orientation of a pedestrian.

7. The vision system of claim 1, wherein said vision system comprises a surround-view vision system and wherein said at least one camera comprises a plurality of cameras disposed at a vehicle and having respective fields of view exterior of the vehicle.

8. The vision system of claim 7, wherein said plurality of cameras includes at least (i) a rear camera disposed at a rearward portion of the vehicle and having a rearward field of view, (ii) a first side camera disposed at a first side of the vehicle and having a sideward field of view at the first side of the vehicle, and (iii) a second side camera disposed at a second side of the vehicle and having a sideward field of view at the second side of the vehicle.

9. A vision system of a vehicle, said vision system comprising:

at least one camera disposed at a vehicle and having a field of view exterior of the vehicle, wherein the field of view encompasses a first region exterior of the vehicle and a second region exterior of the vehicle;

wherein said camera captures image data and wherein captured image data includes a first set of image data representative of the first region of the field of view and a second set of image data representative of the second region of the field of view;

wherein the first region is at a side region of the field of view of said camera and the second region is at a center region of the field of view of said camera;

an image processor operable to process image data captured by said camera;

wherein said image processor processes image data captured by said at least one camera to detect objects present in the field of view of said at least one camera;

wherein said image processor, responsive to processing of image data captured by said at least one camera, determines that a detected object is a pedestrian at least in part responsive to an orientation of the detected object;

wherein said image processor processes the first set of image data and determines a pedestrian present in the first region of the field of view based at least in part on determination that the orientation of an object detected present in the first region of the field of view of said at least one camera corresponds with a first predetermined orientation of a pedestrian;

wherein said image processor processes the second set of image data and determines a pedestrian present in the second region of the field of view based at least in part on determination that the orientation of an object detected present in the second region of the field of view of said at least one camera corresponds with a second predetermined orientation of a pedestrian; and wherein said second predetermined orientation of a pedestrian is different than said first predetermined orientation of a pedestrian, and wherein the second predetermined orientation of a pedestrian is vertical, and wherein the first predetermined orientation of a pedestrian is tilted relative to the second predetermined orientation of a pedestrian.

10. The vision system of claim 9, wherein said image processor processes the first set of image data to determine a pedestrian present in the first region based on a first predetermined size of a pedestrian, and wherein said image processor processes the second set of image data to determine a pedestrian present in the second region based on a second predetermined size of a pedestrian.

11. The vision system of claim 9, wherein, responsive to processing of captured image data over multiple frames of captured image data, said image processor adjusts the first predetermined orientation of a pedestrian and adjusts the second predetermined orientation of a pedestrian.

12. The vision system of claim 11, wherein said image processor adjusts processing of the first set of image data based on the adjusted first predetermined orientation of a pedestrian, and wherein said image processor adjusts processing of the second set of image data based on the adjusted second predetermined orientation of a pedestrian.

13. The vision system of claim 9, wherein said vision system comprises a surround-view vision system and wherein said at least one camera comprises a plurality of cameras disposed at a vehicle and having respective fields of view exterior of the vehicle, and wherein said plurality of cameras includes at least (i) a rear camera disposed at a rearward portion of the vehicle and having a rearward field of view, (ii) a first side camera disposed at a first side of the vehicle and having a sideward field of view at the first side of the vehicle, and (iii) a second side camera disposed at a second side of the vehicle and having a sideward field of view at the second side of the vehicle.

14. A vision system of a vehicle, said vision system comprising:

at least one camera disposed at a vehicle and having a field of view exterior of the vehicle, wherein the field of view encompasses a first region exterior of the vehicle and a second region exterior of the vehicle;

wherein said camera includes a wide angle lens and a two-dimensional array of photosensing elements;

wherein said camera captures image data and wherein captured image data includes a first set of image data representative of the first region of the field of view and a second set of image data representative of the second region of the field of view;

wherein the first region is at a side region of the field of view of said camera and the second region is at a center region of the field of view of said camera;

an image processor operable to process image data captured by said camera;

wherein said image processor processes image data captured by said at least one camera to detect objects present in the field of view of said at least one camera;

wherein said image processor, responsive to processing of image data captured by said at least one camera, determines that a detected object is a pedestrian at least in part responsive to an orientation of the detected object;

wherein said image processor processes the first set of image data and determines a pedestrian present in the first region of the field of view based at least in part on determination that the orientation of an object detected present in the first region of the field of view of said at least one camera corresponds with a first predetermined orientation of a pedestrian;

wherein said image processor processes the second set of image data and determines a pedestrian present in the second region of the field of view based at least in part on determination that the orientation of an object detected present in the second region of the field of view of said at least one camera corresponds with a second predetermined orientation of a pedestrian;

wherein the second predetermined orientation of a pedestrian is vertical, and wherein the first predetermined orientation of a pedestrian is tilted relative to the second predetermined orientation of a pedestrian;

wherein, responsive to processing of captured image data over multiple frames of captured image data, said image processor adjusts the first predetermined orientation of a pedestrian and adjusts the second predetermined orientation of a pedestrian; and wherein said image processor adjusts processing of the first set of image data based on the adjusted first predetermined orientation of a pedestrian, and wherein said image processor adjusts processing of the second set of image data based on the adjusted second predetermined orientation of a pedestrian.

15. The vision system of claim 14, wherein said image processor processes the first set of image data to determine a pedestrian present in the first region based on a first predetermined size of a pedestrian, and wherein said image processor processes the second set of image data to determine a pedestrian present in the second region based on a second predetermined size of a pedestrian.

16. The vision system of claim 14, wherein said vision system comprises a surround-view vision system and wherein said at least one camera comprises a plurality of cameras disposed at a vehicle and having respective fields of view exterior of the vehicle.

17. The vision system of claim 16, wherein said plurality of cameras includes at least (i) a rear camera disposed at a rearward portion of the vehicle and having a rearward field of view, (ii) a first side camera disposed at a first side of the vehicle and having a sideward field of view at the first side of the vehicle, and (iii) a second side camera disposed at a second side of the vehicle and having a sideward field of view at the second side of the vehicle.

* * * * *